US008837552B2

(12) United States Patent
Xia et al.

(10) Patent No.: US 8,837,552 B2
(45) Date of Patent: Sep. 16, 2014

(54) SEALING DEVICE

(75) Inventors: Jiliang Xia, Pori (FI); Tapio Ahokainen, Helsinki (FI); Risto Saarinen, Espoo (FI)

(73) Assignee: Outotec Oyj, Espoo (FI)

( * ) Notice: Subject to any disclaimer, the term of this patent is extended or adjusted under 35 U.S.C. 154(b) by 938 days.

(21) Appl. No.: 12/996,463

(22) PCT Filed: Jun. 5, 2009

(86) PCT No.: PCT/FI2009/050480
§ 371 (c)(1),
(2), (4) Date: Dec. 6, 2010

(87) PCT Pub. No.: WO2009/147302
PCT Pub. Date: Dec. 10, 2009

(65) Prior Publication Data

US 2011/0090934 A1 Apr. 21, 2011

(30) Foreign Application Priority Data

Jun. 6, 2008 (FI) ..................................... 20085565

(51) Int. Cl.

| | |
|---|---|
| ***H05B 7/12*** | (2006.01) |
| ***C03B 5/027*** | (2006.01) |
| ***H05B 3/60*** | (2006.01) |
| ***F27B 14/04*** | (2006.01) |
| ***H05B 7/06*** | (2006.01) |
| ***H05B 7/08*** | (2006.01) |
| ***H05B 7/10*** | (2006.01) |
| ***H05B 7/107*** | (2006.01) |
| ***H05B 7/101*** | (2006.01) |
| ***F16J 15/02*** | (2006.01) |
| ***F16J 15/08*** | (2006.01) |
| ***E21B 33/06*** | (2006.01) |

(52) U.S. Cl.
CPC ........................................ *H05B 7/12* (2013.01)
USPC ................... 373/95; 373/38; 373/51; 373/52; 373/53; 373/54; 373/55; 373/72; 373/77; 373/88; 373/91; 373/92; 373/93; 373/94; 373/96; 373/97; 373/98; 373/99; 373/100; 373/101; 277/630; 277/650; 277/324

(58) Field of Classification Search
CPC .................................... H05B 7/10; H05B 7/12
USPC ......... 373/38, 51–55, 68, 72, 77, 88, 91–101; 277/650, 324, 609, 343, 628, 630
See application file for complete search history.

(56) References Cited

U.S. PATENT DOCUMENTS

| | | | | |
|---|---|---|---|---|
| 3,621,104 | A | 11/1971 | Sofia | |
| 3,697,660 | A * | 10/1972 | Frolov et al. | 373/95 |
| 3,950,602 | A * | 4/1976 | Korsten et al. | 373/114 |
| 4,002,816 | A * | 1/1977 | Zhupakhin et al. | 373/70 |
| 4,137,422 | A * | 1/1979 | Barbashin et al. | 373/71 |
| 4,238,634 | A * | 12/1980 | Krogsrud | 373/95 |
| 4,269,625 | A | 5/1981 | Molenaar | |
| 4,295,001 | A * | 10/1981 | Britton | 373/95 |
| 4,398,078 | A * | 8/1983 | Flower | 219/69.17 |
| 4,424,584 | A * | 1/1984 | Evensen | 373/97 |
| 4,457,002 | A * | 6/1984 | Mathgen et al. | 373/95 |
| 4,498,185 | A * | 2/1985 | Elsner et al. | 373/93 |
| 4,587,658 | A * | 5/1986 | Ball et al. | 373/95 |
| 4,594,722 | A * | 6/1986 | Boder | 373/91 |
| 4,703,493 | A * | 10/1987 | Bakalov et al. | 373/95 |
| 4,759,032 | A * | 7/1988 | Willis | 373/95 |
| 5,274,662 | A * | 12/1993 | Krepel | 373/69 |
| 5,406,580 | A | 4/1995 | McCaffrey | |
| 5,914,979 | A * | 6/1999 | Hill et al. | 373/94 |
| 6,377,605 | B1 * | 4/2002 | McCaffrey | 373/95 |
| 6,466,605 | B1 * | 10/2002 | Wittle et al. | 373/108 |

FOREIGN PATENT DOCUMENTS

| | | | |
|---|---|---|---|
| CN | 1142309 | A | 2/1997 |
| CN | 1926923 | A | 3/2007 |
| DE | 1 540 876 | | 5/1970 |
| DE | 39 40 846 | A1 | 6/1991 |
| EP | 0 437 037 | A2 | 7/1991 |
| EP | 0 827 365 | A2 | 3/1998 |
| FI | 884499 | A | 3/1990 |
| FR | 2 410 804 | A1 | 6/1979 |
| FR | 2 692 665 | A1 | 12/1993 |

| | | | |
|---|---|---|---|
| GB | 1 263 015 | A | 2/1972 |
| JP | 44-019011 | | 8/1969 |
| JP | 59-101198 | U | 7/1984 |
| JP | 61-153993 | A | 7/1986 |
| JP | 6-088680 | A | 3/1994 |
| JP | 11-508962 | A | 8/1999 |
| JP | 11-351541 | A | 12/1999 |
| JP | 2005-156060 | A | 6/2005 |
| SE | 445744 | B | 7/1986 |
| SU | 706942 | | 12/1979 |
| SU | 1035838 | A | 8/1983 |
| SU | 1343567 | A1 | 10/1987 |
| WO | WO 96/34988 | | 11/1996 |
| WO | WO 2005/071335 | A2 | 8/2005 |

OTHER PUBLICATIONS

Office Action (Notification of the First Office Action) dated Nov. 21, 2012, issued in corresponding Chinese Patent Application No. 200980121073.3, and an English Translation thereof. (12 pages).

International Search Report (PCT/ISA/210) issued on Sep. 30, 2009, by Finnish Patent Office as the International Searching Authority for International Application No. PCT/FI2009/050480.

International Preliminary Report on Patentability (PCT/IPEA/409) issued on Sep. 2, 2010, by Finnish Patent Office as the International Searching Authority for International Application No. PCT/FI2009/050480.

Extended European Search Report dated Oct. 22, 2013, issued by the European Patent Office in corresponding European Application No. 09757680.5. (4 pages).

* cited by examiner

*Primary Examiner* — Dana Ross
*Assistant Examiner* — Gyounghyun Bae
(74) *Attorney, Agent, or Firm* — Buchanan Ingersoll & Rooney PC

(57) ABSTRACT

A sealing device is arranged around a rod electrode extending vertically through an aperture made in the ceiling of an arc furnace and being vertically movable inside the furnace to prevent the access of gases from the furnace through the aperture to the atmosphere, and on the other hand to prevent air from flowing from the atmosphere into the furnace. The sealing device comprises a gas distribution chamber provided with an inlet channel for feeding essentially passive gas, such as nitrogen or air, into the gas distribution chamber. The sealing device also includes a slit nozzle encasing the electrode, through which nozzle a gas jet is arranged to be discharged from the gas distribution chamber towards the electrode in a direction that is at an angle with respect to the horizontal plane and has a slightly upwards inclined orientation, and that is, with respect to the furnace interior, pointed outwardly, so that the sealing is carried out owing to the effect of the created stagnation pressure.

14 Claims, 4 Drawing Sheets

SEALING DEVICE

FIELD OF THE INVENTION

Figure 1:
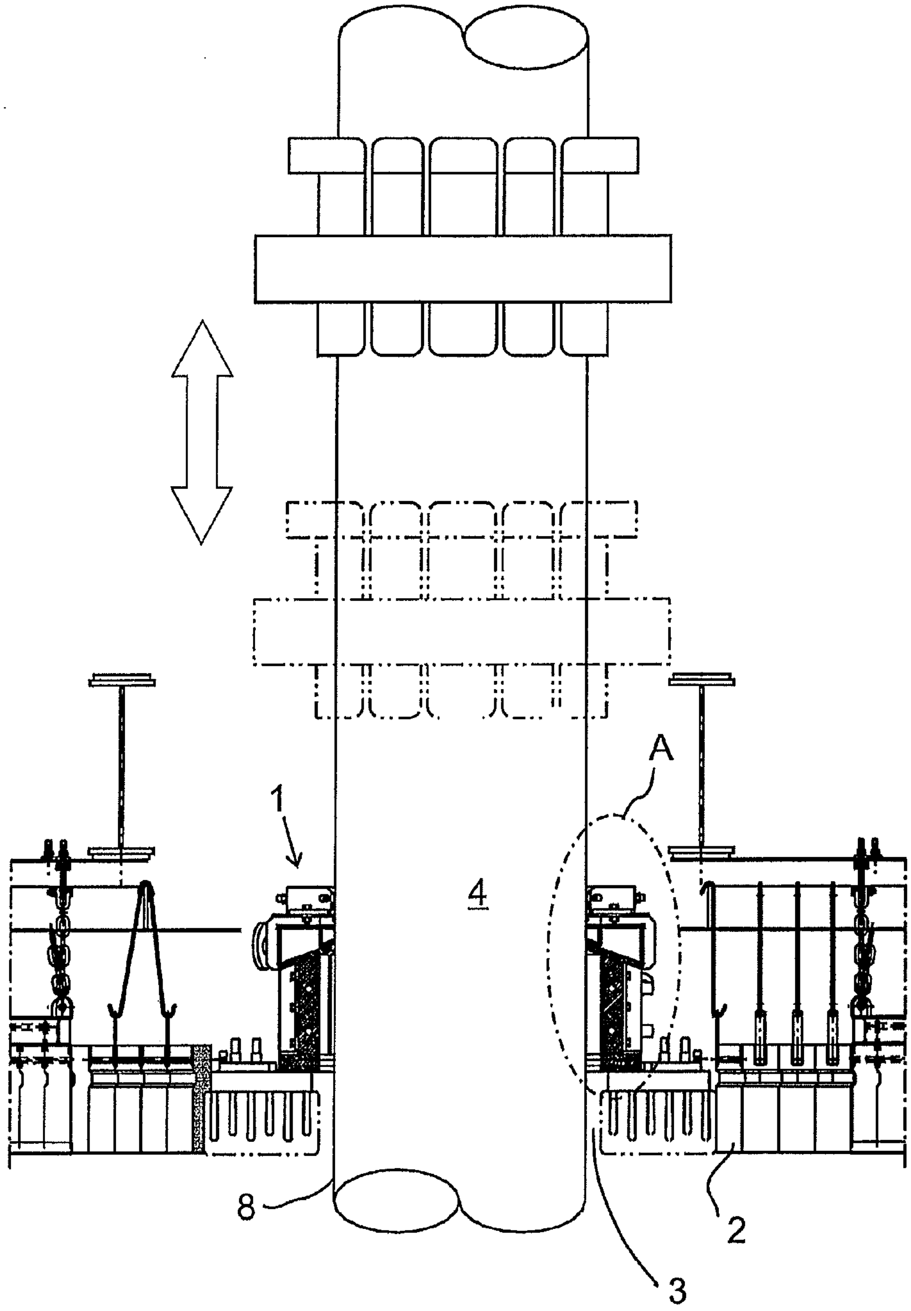

The invention relates to the sealing of electrodes in electric-arc furnaces used in metallurgy. The object of the invention is a sealing device defined in the preamble of claim 1.

BACKGROUND OF THE INVENTION

An arc furnace is an electrically operated furnace used for melting metal and/or for cleaning slag. The operation of the furnace is based on a light arc that burns either between separate electrodes, or between electrodes and the material to be melted. The furnace may be operated either by AC or DC current. Heat is created in the light arc, and also in the material to be melted, in case the light arc burns between the material and the electrodes. Power is conducted to vertical electrodes that are located symmetrically in a triangle with respect to the midpoint of the furnace. The assembly depth of the electrodes in the furnace is continuously adjusted, because they are worn at the tips owing to the light arc.

The electrodes extend into the furnace via through holes located in the furnace ceiling. The diameter of a through hole is larger than the diameter of an electrode, in order to ensure free motion of the electrode, and in order to avoid contact between the electrode and the ceiling. The gap left between the electrode and the ceiling aperture must be sealed in order to prevent the access of gases from inside the furnace through the aperture to the atmosphere, and on the other hand in order to prevent the access of air from the atmosphere to the furnace.

In the prior art there are known sealing devices for sealing the gap left between the electrode and the ceiling aperture by mechanical sealings, for instance by graphite rings, braided rope seals etc. that are hydraulically pressed against the electrode. Various mechanical sealing arrangements are known for example from the publications FI 81197, FI 64458, DE 1540876, and SE 445744. The hydraulic medium used for creating hydraulic compression is water.

A drawback with mechanical sealing devices arises in that in practice, the electrode surface is not perfectly cylindrical and smooth, but it may be out-of-round and uneven, which results in the wearing of the sealings that are in contact with the external surface of the electrode as the electrode moves vertically. Thus the sealing is weakened. In arc furnaces with a reducing atmosphere, any leakage of air into the furnace cannot, however, be allowed. On the other hand, a carbon monoxide atmosphere prevails inside the furnace. Again, any leakage of carbon monoxide to the exterior of the furnace cannot be allowed, because carbon monoxide is very toxic. Further, if air flows into the furnace, the carbon monoxide begins to burn and rises the temperature at the aperture very high, thus destroying the furnace structures. The element of a Söderberg electrode that is located inside the furnace is incandescent graphite. Leakage air causes burning and rapid wearing of the graphite, which increases the consumption of both the Söderberg electrode paste and coke.

Another drawback is the use of water in connection with sealing, because in a damage situation water may accidentally get into the furnace. When water is introduced into the furnace atmosphere with a high temperature, a dangerous water-gas explosion may occur.

OBJECT OF THE INVENTION

The object of the invention is to eliminate the above mentioned drawbacks.

A particular object of the invention is to introduce a sealing device where the sealing is carried out without a contact with the electrode.

Another object of the invention is to introduce a sealing device that efficiently prevents air leakages into the furnace and gas leakages out of the furnace.

Yet another object of the invention is to introduce a sealing device where the use of water is avoided.

In addition, an object of the invention is to introduce a sealing device owing to which the wearing of electrodes is reduced.

SUMMARY OF THE INVENTION

A sealing device according to the invention is characterized by what is set forth in claim 1.

According to the invention, the sealing device which is arranged around a rod electrode extending vertically through an aperture made in the ceiling of an arc furnace and being vertically movable inside the furnace to prevent the access of gases from the furnace through the aperture to the atmosphere, and on the other hand to prevent the access of air from the atmosphere into the furnace, has a gas distribution chamber provided with an inlet channel for feeding essentially passive gas, such as nitrogen or air, into the gas distribution chamber, and a nozzle through which the gas flow is arranged to be discharged from the gas distribution chamber towards the electrode.

According to the invention, the nozzle is a slit nozzle encasing the electrode and discharging a gas jet in a direction that is, with respect to the horizontal plane, oriented at an angle that is inclined slightly upwards, and that is, with respect to the furnace interior, pointed outwardly, so that the sealing is carried out owing to the effect of stagnation pressure.

An advantage of the invention is that as the gas flow is discharged from the slit nozzle encasing the electrode in a direction that is, with respect to the horizontal plane, oriented at an angle that is inclined slightly upwards, and that is, with respect to the furnace interior, pointed outwardly, gas leakages out of the furnace can be prevented when positive pressure prevails inside the furnace and, on the other hand, air leakages into the furnace can be prevented when negative pressure prevails inside the furnace, and the gap between the electrode and the sealing device is practically closed by the effect of stagnation pressure. The arrangement according to the invention functions at all times, irrespective of whether a negative or positive pressure prevails in the furnace. The pressure in the furnace may vary for example from a negative pressure of −70 Pa to a positive pressure of 22 Pa, with respect to the ambient air pressure. This means that excellent sealing can be provided by the sealing device in all operating conditions of the furnace.

A further advantage of the invention is that the sealing device is not worn, and the sealing is not weakened, even if the electrode was somewhat out-of-round and uneven. Thus the device has a long maintenance interval. The sealing device does not include any hydraulics using water, wherefore water leakages cannot occur in the furnace. Yet another advantage is that air leakages to the furnace and gas leakages from the furnace are efficiently prevented, in which case the wearing of the electrode is reduced.

In an embodiment of the sealing device, the gas flow is discharged through the slit nozzle at an angle that is about 15°-25° with respect to the horizontal plane.

In an embodiment of the sealing device, the distance of the slit nozzle from the outer surface of the electrode is about 10-40 mm.

In an embodiment of the sealing device, the nozzle slit height of the slit nozzle is about 5 mm.

In an embodiment of the sealing device, the gas flow rate from the slit nozzle is at least about 10 m/s.

In an embodiment of the sealing device, the gas pressure in the gas distribution chamber is about 3-4 kPa. This kind of pressure can be created by a blower.

In an embodiment of the sealing device, the electrode is a so-called Söderberg electrode, where a so-called Söderberg electrode paste is placed inside metallic tube casing. As an alternative, the electrode can be a graphite electrode.

In an embodiment of the sealing device, the sealing device is assembled on top of an electrically insulating slide bearing comprising a metallic first base ring, which is arranged on top of the edge of an aperture provided in the furnace ceiling. A second base ring made of electrically insulating material is arranged on top of the first base ring. A metallic third base ring is arranged on top of the second base ring. On the third base ring, the sealing device rests only by gravity, without other fastening. The machined surfaces of the base plates allow a limited lateral movement for the sealing device in order to adapt to the lateral movement of the electrode.

In an embodiment of the sealing device, the sealing device includes a number of centering rollers that are arranged in circular fashion on top of the gas distribution chamber, to be supported against the outer surface of the electrode. The centering rollers keep the distance between the slit nozzle and the outer surface of the electrode essentially constant.

In an embodiment of the sealing device, the centering rollers are arranged by springs to move horizontally within a limited range.

In an embodiment of the sealing device, the sealing device includes a cooling element made of copper, inside which element there is arranged a duct for the cooling water circulation.

In an embodiment of the sealing device, the cooling element is attached to the metal frame of the sealing device, underneath the gas distribution chamber.

In an embodiment of the sealing device, the sealing device is provided with a refractory lining that is attached to the metal frame underneath the gas distribution chamber.

In an embodiment of the sealing device, the sealing device is compiled of two or more identical segments that are detachably interconnected in order to form a circular structure encasing the electrode.

LIST OF DRAWINGS

Figure 2:
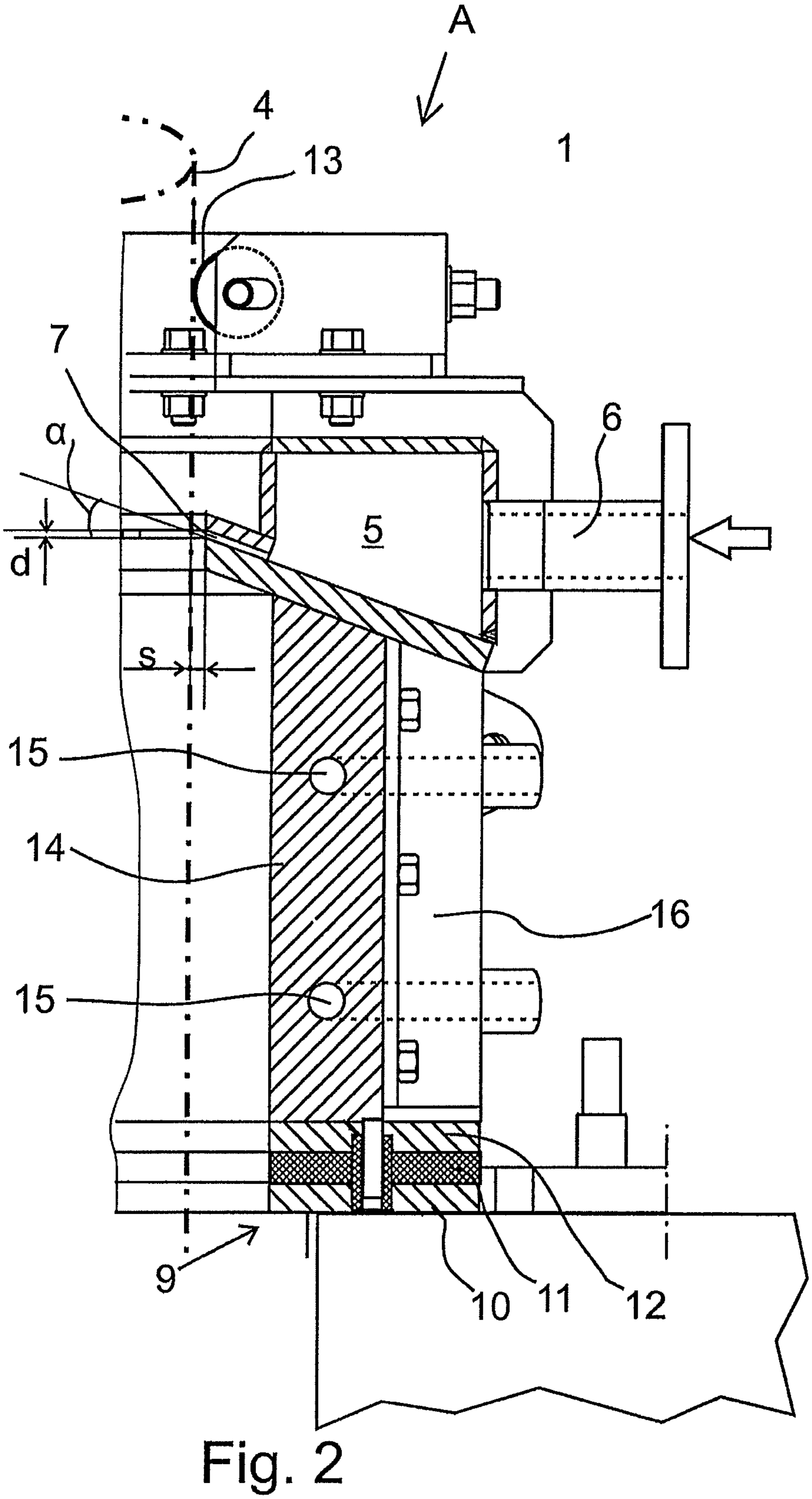
Figure 3:
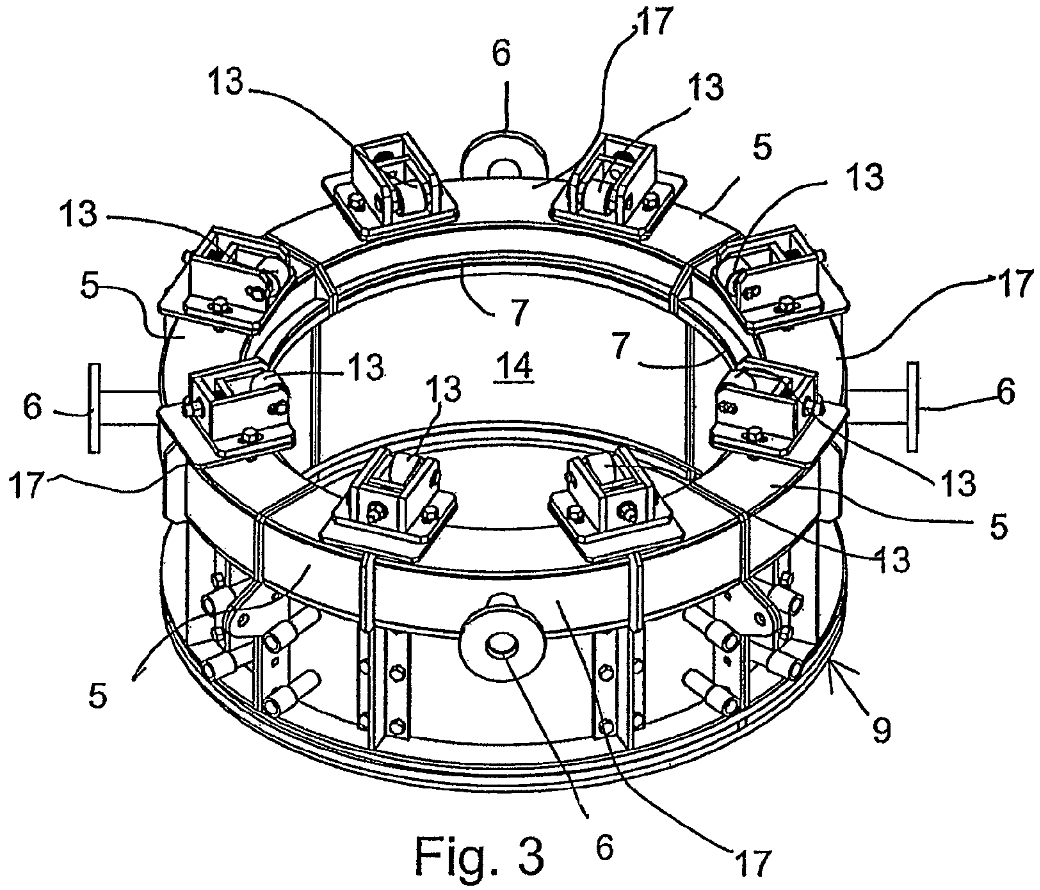

The invention is described in more detail below with reference to preferred embodiments and to the appended drawing, where FIG. 1 is a schematical cross-section of the ceiling of an electric-arc furnace, where an embodiment of the sealing device according to the invention is assembled around the electrode, FIG. 2 illustrates a detail A of FIG. 1, FIG. 3 illustrates the sealing device according to FIGS. 1 and 2, viewed from above in an axonometrically inclined direction.

Figure 4:
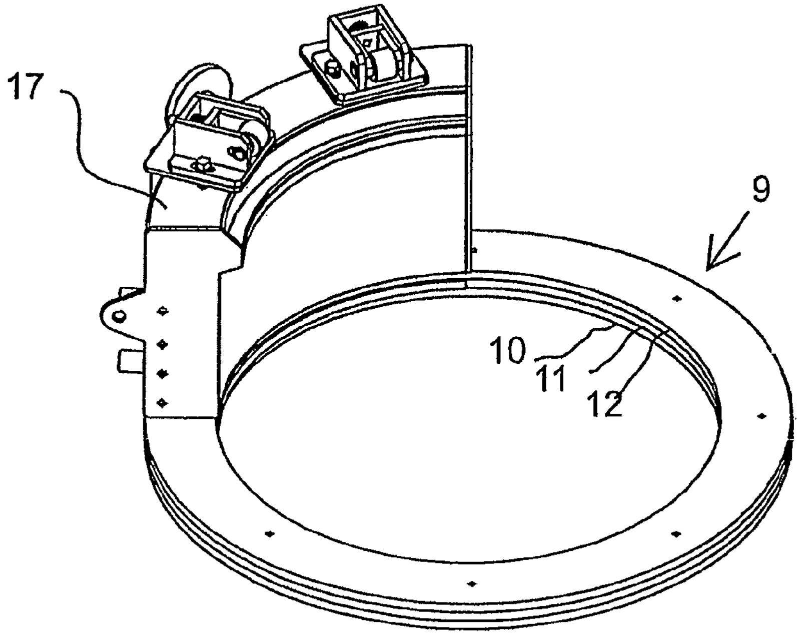
Figure 5:
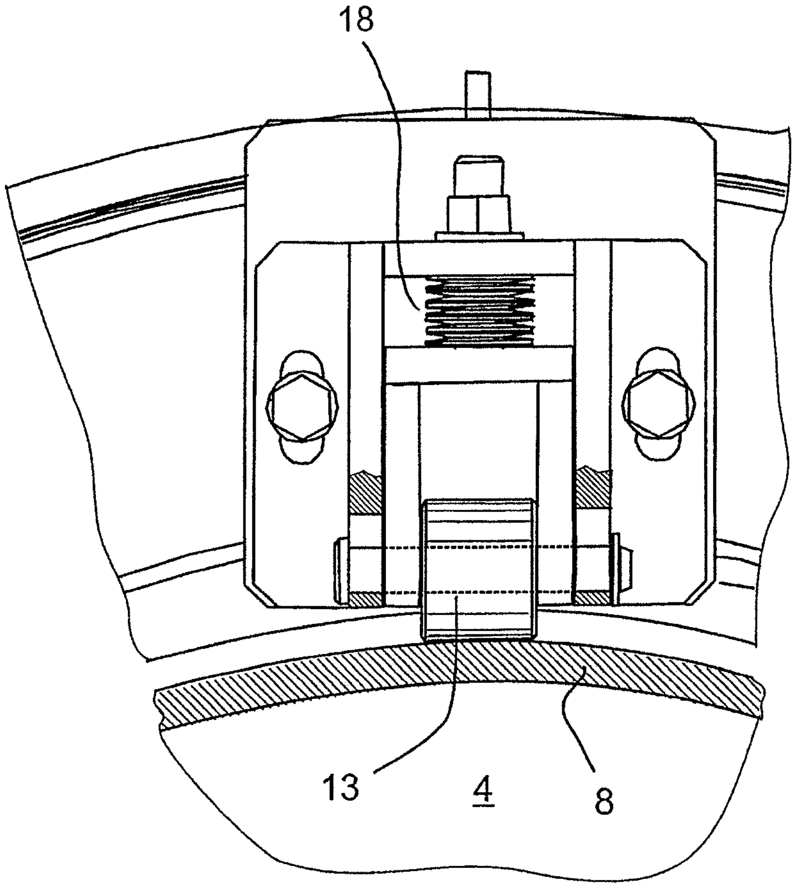

FIG. 4 illustrates one of the four segments of the sealing device shown in FIG. 3, placed on base rings, and FIG. 5 illustrates one sprung centering roller of the sealing device shown in FIGS. 1-4, as viewed from above.

DETAILED DESCRIPTION OF THE INVENTION

FIG. 1 shows part of the arc furnace ceiling 2, provided with an aperture 3 that constitutes the feed-through for the vertical rod electrode 4. On top of the edge of the aperture 3, there is arranged the sealing device 1 shown in FIG. 3, said sealing device encasing the electrode 4. The electrode 4 is a so-called Söderberg electrode, containing so-called Söderberg electrode paste inside a cylindrical steel casing 8. In another embodiment, the electrode can be a graphite electrode. The diameter of the electrode 4 can be of the order 500-1200 mm. The sealing device, prevents the leakage of gases from inside the furnace through the aperture 3 to the atmosphere, and on the other hand, it also prevents air leakages into the furnace.

From FIGS. 2 and 3 it is apparent in more detail that the sealing device 1 includes a gas distribution chamber 5 provided with an inlet channel 6, through which air or nitrogen is fed in the gas distribution chamber 5. From the gas distribution chamber 5, gas is discharged through the slit nozzle 7 encasing the electrode towards the electrode 4 in a direction which is, with respect to the horizontal plane, at an angle $\alpha$ that is inclined slightly upwards, and with respect to the furnace interior directed outwardly, in order to form an annular gas sealing around the electrode by means of the created stagnation pressure. Gas is advantageously discharged from the slit nozzle 7 at an angle $\alpha$, which is inclined about 15°-25° upwards with respect to the horizontal plane. Now the sealing gas is exhausted mainly outwardly, and it does not flow into the furnace.

The distance s of the slit nozzle 7 from the live outer surface of the electrode 4 is about 10-40 mm. The slit height d of the slit nozzle is about 5 mm. The gas outlet flow rate from the slit nozzle 7 is at least about 10 m/s. The gas pressure in the gas distribution chamber 5 is about 3-4 kPa, which can be achieved by a regular blower. It is not necessary to use pressurized air here. Said measures are given by way of example in a given embodiment. The measures may vary according to the embodiment in question. From FIGS. 2 and 4 it is apparent that the sealing device 1 is set to rest only by gravity (the weight of the sealing device is typically for example 500-1000 kg, depending on the embodiment in question) on top of the electrically insulating slide bearing 9. The slide bearing 9 allows a horizontal sliding of the sealing device 1, as the electrode moves in the sideways direction. Lowest underneath is a first base ring flange 10, which is made of steel and arranged on top of the edge of the aperture 3. A second base ring flange 11 made of electrically insulating material is placed on top of the first base ring flange. A third base ring flange 12, which is made of steel, is placed on top of the insulating second base ring flange 11. The sealing device 1 is placed on the third base ring flange 12. The lower surface of the metal frame 16 of the sealing device 1 is horizontal and machined. Likewise, the upper surface of the third base plate ring 12 is horizontal and machined, and thus the sealing device 1 is free to slide thereupon horizontally, so that the sealing device is adapted to the lateral movement of the electrode.

From FIG. 3 it can be seen that the sealing device 1 is modular and compiled of four identical segments 17, which are detachably interconnected in order to form a circular structure encasing the electrode 4. FIG. 4 displays one such segment 17. Each segment 17 has its own metal frame 16, in which there is integrated a gas distribution chamber 5, which is not in flowing communication with the gas distribution chambers 5 of other segments, and an own inlet channel 6, through which gas is fed into the chamber 5. The slit nozzle 7 extends along the whole 90 degrees of the arch of the segment 17.

From FIGS. 2-5 it is seen that the sealing device 1 includes a number of centering rollers 13, in this example eight rollers, which are arranged in circular fashion on top of the gas distribution chamber 5 in order to be supported against the outer surface of the electrode 4. The centering rollers 13 maintain the distance s between the slit nozzle 7 and the outer surface of the electrode 4 essentially constant, but owing to the elastic support of the rollers 13 (see spring 18 in FIG. 5), a limited movement is allowed for the electrode 4. As the electrode 4 moves laterally, the centering rollers 4 first yield elastically to a certain extent. If the lateral movement of the electrode 4 further continues, the whole sealing device 1 begins to slide on the slide bearing 9. This prevents the electrode 4 from being damaged.

In FIG. 2 it is further seen that in the sealing device 1 there can be a cooling element 14 made of copper, which is attached to the metal frame 16 of the sealing device 1 underneath the gas distribution chamber 5. A duct 15 can be arranged inside the cooling element 4 for the cooling water circulation. As an alternative, the cooling element 14 can be replaced by refractory lining, which is attached to the metal frame 16 underneath the gas distribution chamber 5.

The invention is not restricted to the above described embodiments only, but many modifications are possible within the scope of the inventive idea defined in the appended claims.

The invention claimed is:

1. A sealing device arranged around a rod electrode extending vertically through an aperture made in the ceiling of an arc furnace and being vertically movable inside the furnace to prevent the access of gases from the furnace through the aperture to the atmosphere, and on the other hand to prevent air from flowing from the atmosphere into the furnace, the sealing device comprising:

a gas distribution chamber provided with an inlet channel for feeding gas in the gas distribution chamber, and a nozzle through which a gas jet is arranged to be discharged from the gas distribution chamber towards the electrode, wherein the nozzle is a slit nozzle encasing the electrode and discharging the gas jet in a direction that is at an angle with respect to the horizontal plane and has a slightly upwards inclined orientation, and that is, with respect to the furnace interior, pointed outwardly, so that the sealing is carried out owing to the effect of the created stagnation pressure; and that the sealing device is assembled on an electrically insulating slide bearing comprising:

a metallic first base ring that is arranged on top of the edge of the aperture, a second base ring made of an electrically insulating material, arranged on top of the first base ring, and a metallic third base ring that is arranged on top of the second base ring, so that on top of said third base ring, the sealing device is arranged to rest only by gravity, without other fastening, in order to allow a limited lateral movement of the sealing device for adapting to the lateral movement of the electrode.

2. A sealing device according to claim 1, wherein from the slit nozzle, a gas flow is discharged at an angle, which is about 15°-25° with respect to the horizontal plane.

3. A sealing device according to claim 1, wherein the distance of the slit nozzle from the live outer surface of the electrode is about 10-40 mm.

4. A sealing device according to claim 1, wherein the height of the slit of the slit nozzle is about 5 mm.

5. A sealing device according to claim 1, wherein the gas flow rate from the slit nozzle is at least about 10 m/s.

6. A sealing device according to claim 1, wherein the gas pressure in the gas distribution chamber is about 3–4 kPa.

7. A sealing device according to claim 1, wherein the electrode is a so-called Söderberg electrode containing so-called Söderberg electrode paste inside a metallic tube casing.

8. A sealing device according to claim 1, wherein the electrode is a graphite electrode.

9. A sealing device according to claim 1, wherein the sealing device includes a number of centering rollers that are arranged in circular fashion on top of the gas distribution chamber to be supported against the outer surface of the electrode in order to maintain the distance between the slit nozzle and the outer surface of the electrode essentially constant.

10. A sealing device according to claim 9, wherein the centering rollers are arranged to be horizontally movable on springs within a limited range.

11. A sealing device according to claim 1, wherein the sealing device includes a cooling element made of copper, inside which element there is provided a duct for the cooling water circulation.

12. A sealing device according to claim 11, wherein the cooling element is attached to the metal frame of the sealing device, underneath the gas distribution chamber.

13. A sealing device according to claim 1, wherein the sealing device is provided with refractory lining, which is attached to the metal frame, underneath the gas distribution chamber.

14. A sealing device according to claim 1, wherein the sealing device is composed of two or more essentially identical segments that are detachably interconnected in order to form a circular structure encasing the electrode.

* * * * *